UNITED STATES PATENT OFFICE.

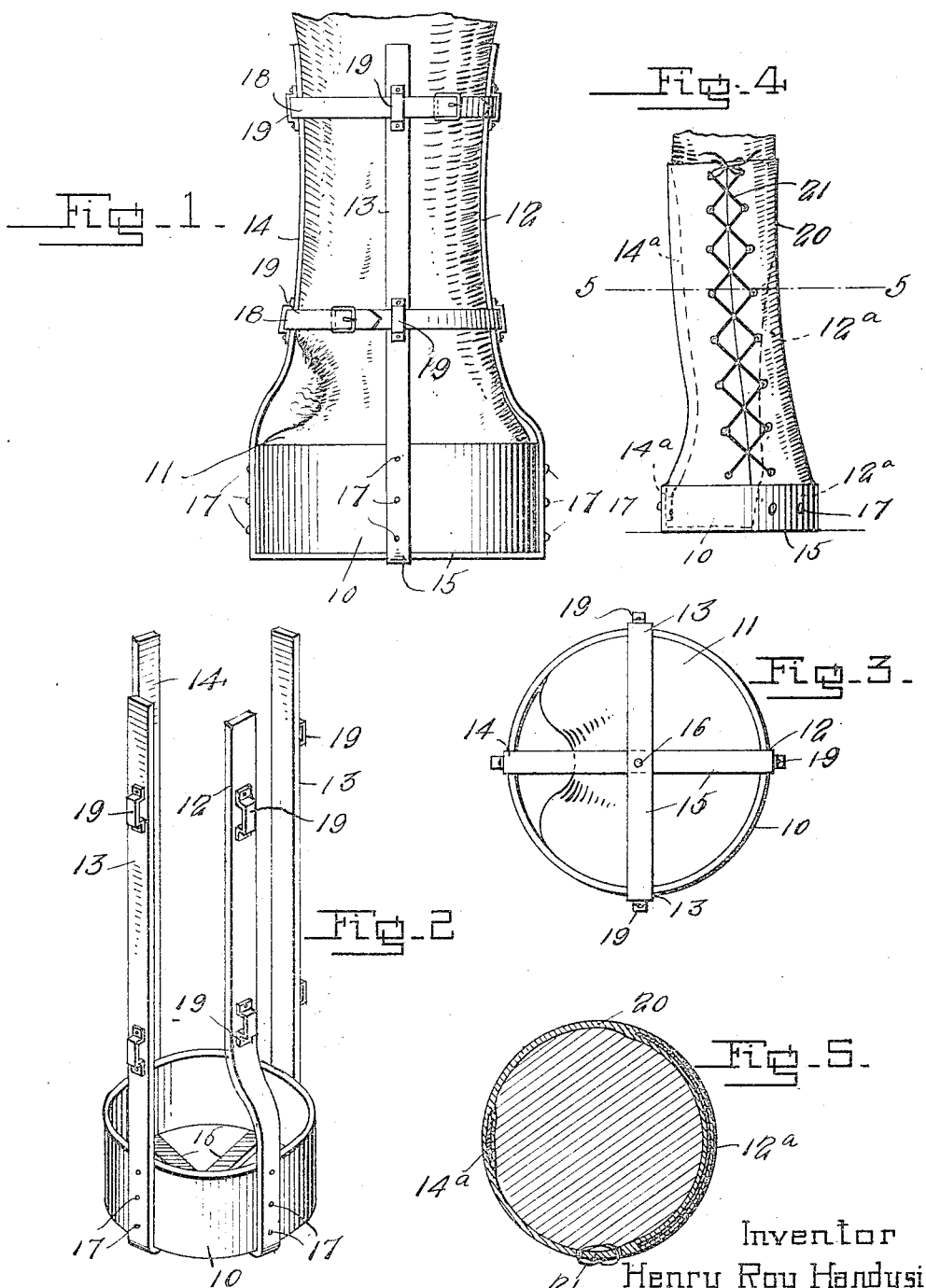

HENRY ROY HANDYSIDE, OF WARSAW, NEW YORK.

ANIMAL ANKLE AND LEG SUPPORT.

1,256,895.  Specification of Letters Patent.  Patented Feb. 19, 1918.

Application filed May 23, 1917.  Serial No. 170,504.

*To all whom it may concern:*

Be it known that I, HENRY ROY HANDYSIDE, a citizen of the United States, and a resident of Warsaw, in the county of Wyoming and State of New York, have invented a certain new and useful Improvement in Animal Ankle and Leg Supports, of which the following is a specification.

The present invention relates to a brace or support for the ankles and legs of horses, colts, cows, and other animals, and has for its primary object to provide a support by means of which the hoof is held securely in proper place.

Another object of this invention is to provide means, in a support of this character, for supporting the weak part of the leg or ankle, which may be adapted to legs and ankles varying in thickness and shape, to provide a hoof socket which will not work upwardly on the hoof and which will admit moisture to the same, and which will support a canvas sleeve or boot adapted to be laced about the ankle and leg.

Other objects and advantages of this invention will be brought out in the following detailed description of the present preferred embodiment, the same being illustrated in the accompanying drawing wherein:

Figure 1 is a side elevation of the support of this invention applied to the foot of an animal.

Fig. 2 is a detail perspective view of the support, the securing straps being removed.

Fig. 3 is a bottom plan view of the support, showing the open bottom of the hoof socket.

Fig. 4 is a side elevation of the support of this invention having a supporting sleeve or boot applied thereto.

Fig. 5 is a horizontal section taken on the line 5—5 of Fig. 4 and showing the arrangement of the braces of the support of this invention as applied to the boot or sleeve.

Referring to this drawing, 10 designates the hoof socket which is in the form of an annular band of steel or other relatively stiff and heavy material. The band 10 is made of a size and shape to snugly receive the hoof 11 of an animal's foot therein. Arranged at spaced intervals around the band 10 is a plurality of upwardly extending resilient brace bars 12, 13, and 14. The brace bar 12 is preferably arranged at the front of the socket 10 and is preferably curved inwardly to conform to the front of the ankle and foot. The brace bars 13 are preferably arranged at the opposite sides of the socket 10 and are adapted to extend upwardly against the opposite sides of the ankle and foot to brace the same. The brace bar 14 is preferably located at the rear side of the socket 10 and extends upwardly, and is slightly curved inwardly to conform to the rear side of the ankle and the leg.

The socket 10 is preferably closed at its lower end to prevent the socket from working upwardly on the hoof 11. To accomplish this purpose, and to also leave the socket somewhat open at its bottom to admit moisture to the hoof, the band is provided with transversely extending bars 15, which are preferably two in number, and are crossed at their intermediate portions beneath the hoof. A rivet 16 may be employed for holding the crossed portions of the bars 15 from displacement. As shown in the drawings, the bars 15 comprise the intermediate portions of single length of steel straps which are bent substantially U-shape to provide the front and rear braces 12 and 14, and the lateral braces 13. These steel straps are secured to the socket 10 by rivets 17 or the like which pass through the sides of the band 10. Attaching or securing straps 18 are secured about the ankle and leg of the animal and engage over the outer sides of the brace bars 12, 13 and 14, the bars being provided with loops 19 adapted to receive the straps 18 therethrough and to hold the latter from shifting vertically on the brace bars. These loops 19 are preferably formed of resilient metal to permit of the flexing of the brace bars as the latter are bound tightly about the ankle and leg.

In Figs. 4 and 5 of the drawing there is disclosed a slight modification of this structure. The socket 10 is provided at its forward side with a flexible sheet steel brace or guard 12$^a$, and at its rear side with an upwardly extending flexible brace bar 14$^a$. These braces 12$^a$ and 14$^a$ are embedded in the layers of fabric of a canvas sleeve or boot 20 which is secured about the ankle and leg by lacing 21. The fabric 20 takes the place of the securing straps 18 and binds the braces tightly against the ankle and leg, the braces being flexible to conform to the curvatures of the leg.

It is of course understood that the above-specifically described support may be modified and changed within the scope of the following claims in order to adapt the support to the ankles and legs of various kinds of animals, and the socket 10 may be modified in order to adapt it to hoofs of various sizes and shapes.

I claim:

1. In a support of the character described, a hoof socket adapted to receive the hoof of an animal therein, resilient braces secured to the socket and extending upwardly therefrom, and straps surrounding the braces and adapted to be drawn taut to flex the braces to cause the same to conform to and support the ankle and leg of the animal, and to hold the hoof in its natural position.

2. In a support of the character described, a hoof socket adapted to receive the hoof of an animal therein, and bars extending across the lower end of the socket for engagement with the hoof to prevent the socket from working upwardly on the hoof, said bars providing openings therebetween to admit moisture to the hoof.

3. In a support of the character described, a hoof socket comprising a relatively stiff band adapted to surround the hoof, and a plurality of U-shaped resilient straps looped across the underside of said socket and extending upwardly above the same to provide braces to support the ankle and leg of the animal.

4. In a support of the character described, a hoof socket adapted to receive the hoof of an animal therein, a plurality of U-shaped resilient straps looped across the underside of the socket and extending upwardly therefrom, and flexible straps encircling the upper end of said U-shaped straps and adapted to be drawn taut to bind the same against the ankle and leg of the animal.

5. In a support of the character described, a hoof socket adapted to receive a hoof of an animal therein, a plurality of resilient straps looped across the bottom of said socket and extending upwardly beyond the same, resilient loops secured to the outer faces of said straps above said socket, and flexible straps threaded through said loops and adapted to be drawn taut to flex the resilient straps against the opposite sides of the ankle and leg of the animal for supporting the same and for holding said socket in place.

6. In a support of the character described, a hoof socket adapted to receive the hoof of an animal therein, a flexible boot extending upwardly from the socket and encircling the ankle and leg of the animal, and resilient braces carried by the socket and extending upwardly in the boot to reinforce the same, said boot being adapted to be tightened upon the ankle and leg of the animal to flex the braces thereagainst to support the same and to retain the boot and the socket in position.

HENRY ROY HANDYSIDE.

Copies of this patent may be obtained for five cents each, by addressing the "Commissioner of Patents, Washington, D. C."